US009071133B2

(12) United States Patent
Gruber et al.

(10) Patent No.: US 9,071,133 B2
(45) Date of Patent: Jun. 30, 2015

(54) SWITCHED-MODE POWER SUPPLY DEVICE AND USE OF SUCH A SWITCHED MODE POWER SUPPLY DEVICE

(71) Applicant: exscitron GmbH, Chemnitz (DE)

(72) Inventors: Stephan Gruber, Chemnitz (DE); Rene Franzky, Chemnitz (DE); Winfried Beyer, Chemnitz (DE); Gerd Meyhoefer, Dresden (DE); Daniel Josefus, Chemnitz (DE)

(73) Assignee: exscitron GmbH, Chemnitz (DE)

( * ) Notice: Subject to any disclaimer, the term of this patent is extended or adjusted under 35 U.S.C. 154(b) by 0 days.

(21) Appl. No.: 14/303,777

(22) Filed: Jun. 13, 2014

(65) Prior Publication Data
US 2014/0375229 A1     Dec. 25, 2014

(30) Foreign Application Priority Data

Jun. 19, 2013   (DE) .......................... 10 2013 106 425

(51) Int. Cl.
H05B 37/02     (2006.01)
H02M 7/12      (2006.01)

(52) U.S. Cl.
CPC ......... *H02M 7/12* (2013.01); *H05B 37/02* (2013.01)

(58) Field of Classification Search
USPC .......... 315/291, 200 R, 209 R, 224, 276, 277, 315/279, 308
See application file for complete search history.

(56) References Cited

U.S. PATENT DOCUMENTS 5,872,429 A * 2/1999 Xia et al. .................. 315/194

| 6,140,777 A  | 10/2000 | Wang et al.   |
| 6,300,723 B1 | 10/2001 | Wang et al.   |
| 6,320,772 B1 | 11/2001 | Doyama et al. |

(Continued)

FOREIGN PATENT DOCUMENTS

| DE | 69920871 A1      | 5/2005 |
| DE | 102007058633 A1  | 4/2009 |

(Continued)

*Primary Examiner* — Minh D A
(74) *Attorney, Agent, or Firm* — Bachman & LaPointe, PC

(57)     ABSTRACT

Switched-mode power supply device having an input for receiving an AC voltage input signal, an output for providing a DC voltage signal and/or a direct-current signal to a downstream consumer, a transformer having a primary winding and a secondary winding, and resonant converter means assigned to the primary side of the transformer, which resonant converter means form an LLC topology with inclusion of the primary winding and can be actuated with a variable-frequency control signal on the primary side by means of a control unit, wherein the control unit, which is realized by means of an integrated and/or programmable circuit component, generates the control signal in reaction to and as a function of a zero-crossing detection signal generated from the AC voltage input signal, a current flowing in the transformer windings, in particular on the secondary side, and a constant and/or predeterminable preset signal for an output current flowing at the output, in such a way that regulating means associated with the control unit regulate the output current to the preset signal, and a phase of an input current flowing in the input is synchronized to the phase of the AC voltage input signal, wherein means for generating a sinusoidal signal profile are associated with the regulating means, which signal profile-generating means are independent of the AC voltage input signal and act independently thereof.

10 Claims, 3 Drawing Sheets

(56) References Cited

U.S. PATENT DOCUMENTS

| | | | |
|---|---|---|---|
| 6,784,624 B2 * | 8/2004 | Buonocunto | 315/247 |
| 8,169,805 B2 | 5/2012 | Schill | |
| 8,358,523 B2 | 1/2013 | Schill | |
| 8,729,811 B2 * | 5/2014 | Melanson | 315/219 |
| 2006/0158912 A1 | 7/2006 | Wu et al. | |
| 2008/0137381 A1 | 6/2008 | Beasley | |
| 2009/0273301 A1 | 11/2009 | De Anna et al. | |

FOREIGN PATENT DOCUMENTS

| | | |
|---|---|---|
| DE | 102011109333 A1 | 2/2013 |
| DE | 102012111853 A1 | 8/2013 |

* cited by examiner

SWITCHED-MODE POWER SUPPLY DEVICE AND USE OF SUCH A SWITCHED MODE POWER SUPPLY DEVICE

BACKGROUND OF THE INVENTION

The present invention relates to a switched-mode power supply device. The present invention also relates to the use of such a switched-mode power supply device.

The background of the invention is firstly formed by common switching topologies for realizing switched-mode power supplies which enable improved power densities with smaller dimensions and a relatively compact and inexpensive configuration. Thus, for example, it is known from the prior art to assume a resonant converter according to the LLC topology, wherein an LLC resonant converter such as this fundamentally enables a high degree of efficiency but, in particular in the case of electrical consumers provided at the output which have a high power consumption (that is to say having a high electrical load), shows strong non-linear system perturbation effects.

It can also be assumed from the prior art and in relation to the technical background to provide switched-mode power supplies with regard to their system perturbance with the help of so-called power factor correction (PFC), wherein such technologies are usually provided on the primary side of the transformer provided in the switched-mode power supply in order to shape the current profile to be as sinusoidal as possible and to reduce the one reactive current component. In this respect, so-called passive PFC applications are known, usually realized as harmonics filters or mains filters with high inductivity for power factor correction; however, so-called active PFC applications, which, as switching stage upstream of the converter, actively readjust the current drawn to the temporal profile of the sinusoidal mains voltage, are also likewise assumed.

However, in particular, active PFCs such as this are disadvantageous for an optimum degree of efficiency of a switched-mode power supply device.

The switched-mode power supply device according to DE 10 2012 111 853, which is applicable as generic prior art, from the applicant already achieved an optimization in this outlined technical voltage field: by means of a control unit which is typically realized as integrated (or programmable) circuit component, on the one hand, an effective power factor correction is achieved (without the need for a separate PFC network or further discrete components for such a realization) by said functionality (in the integrated component) being combined with a current regulating functionality for the output current and a suitable actuation for the converter. In addition to a significant reduction in complexity in terms of hardware or components, the possibility of performing flexible parameterization of the switched-mode power supply system by suitable programming and thus of achieving a high universality of the device with good regulation and converter properties is advantageous in the case of said technology which forms the starting situation for the present invention, wherein a generic device such as this is then suitable, in particular, for current regulation processes in connection with LED illuminants as output-side load, but can also be additionally used in a flexible manner.

However, the technology disclosed in DE 10 2012 111 853 is also still potentially in need of improvement in certain operation situations. Thus, it has become apparent, particularly during the practical testing of said technology, that disturbances which are very large or which follow one another in quick succession in the AC voltage input signal lead to disadvantageous influences on the output current, despite the disturbance-suppression measures which have already been implemented.

The double signal graph of FIG. 3 for practical operation of the device described in DE 10 2012 111 853 (wherein the lower curve 20 compares the profile of the AC voltage input signal with the profile 30, which is proportional to time, of the output current, in the case of typical signal amplitudes and resolutions of the signal according to the key) shows such an influence: it becomes apparent that a voltage drop (owing to disturbances) of approximately 70 volts in a period (fifth signal period of the voltage signal 20) leads to a significant influence on the output current 30, caused in particular by the fact that, in the principle disclosed in DE 10 2012 111 853, the signal shape of the AC voltage input signal 20 is used in order to derive therefrom the sinusoidal profile for the output current. However, since in the case of the disturbance illustrated in FIG. 3, provided that a large signal-shape impairment occurs, this leads to a variation in brightness of an LED load which is usually controlled on the output side, it being possible to detect said variation in brightness by the selective drop of the output current 30 according to FIG. 3, and which in turn is visually discernible and is perceived as a disturbing lighting effect.

SUMMARY OF THE INVENTION

It is therefore the object of the present invention, proceeding from the technology disclosed in DE 10 2012 111 853, to make the output current of the resonant converter means independent of fluctuations in the input voltage, in particular to effect an improved insensitivity with respect to signal disturbances of the AC voltage input signal, wherein, at the same time, as has already been discussed in particular in connection with DE 10 2012 111 853 (which should be incorporated into the present application insofar as it relates to the invention), advantageous properties in the system perturbance should be maintained.

The object is achieved by means of the switched-mode power supply device having the features disclosed herein and the use thereof; advantageous developments of the invention are also described herein. In a variation of the LLC resonant converter principle according to the main claim, protection is also likewise claimed for an embodiment of the invention by means of an LC resonant converter, insofar as it is similar to DE 10 2012 111 853.

Means for generating a sinusoidal signal profile which are provided independently of the AC voltage input signal and which act independently of said AC voltage input signal are advantageously according to the invention and as a development or variation of the generic technology according to DE 10 2012 111 853 associated with the regulating means according to the invention (which can be realized according to the invention by means of the integrated or programmable circuit component). In particular, it is hence provided according to the invention that, for example, the profile (which is usually sinusoidal but, as mentioned at the outset, also potentially open to influence by signal disturbances) of the AC voltage input signal is not used for generating or influencing the (sinusoidal) output current; rather, for this purpose, the separate sine generation means, which are independent from the AC voltage input signal, are used.

In this case, it falls under the context of preferred developments of the invention to implement this by means of a generator which is realized outside of the control unit, for example, wherein, in particular, discrete circuit technologies of any known kind can come into consideration here. Realizing the means according to the invention for generating the sinusoidal signal profile by means of the control unit according to the invention, for example, in such a way that storage or table means are provided in said signal-generating means, in which storage or table means a sine profile is imaged in terms of data, for example by means of suitably quantized profile values, is also comprised by the invention and is to be considered an expedient variant. Again, in addition or as a variant, the invention provides such a sine profile (in terms of data), further preferably by means of the control unit, suitable for functionally calculating on the basis of a conversion of a sine function, such that a suitable (digital) sine function can be made available independently of tabular or stored values.

It would then also be advantageous and preferred within the context of the invention for said correspondingly configured means for generating the sinusoidal signal profile to be able to interact with means according to the development for detecting an operating temperature or another temperature parameter of the switched-mode power supply device, for example in such a way that, in reaction to a predetermined temperature threshold value being reached or in another functional connection to a detected temperature, the output current is influenced (typically reduced) by means of the sine amplitude in the sine generation means being influenced, for example by means of a suitable proportional reduction of the sine amplitude (for example by multiplication by a suitable temperature-dependent factor). The same applies to the dimming means which can be provided according to the development and which, for example in the case of the preferred use of the present invention as current controller for LED illuminants as load, effect the desired dimming of said illuminants by means of regulation of the output current. Advantageously and in accordance with the development, this could also occur in the form of a correspondingly proportional influence on an amplitude of the sine profile of the means according to the invention for generating the sinusoidal signal profile.

In order to realize the present invention, it has also proven to be preferable still to use the zero-crossing of the AC voltage input signal as clock or trigger and synchronization for the transformation or regulation behavior of the switched-mode power supply device according to the invention. However, owing to the fact that, according to the invention—see above—a sine profile which is generated separately and independently of the typically sinusoidal profile of the AC voltage input signal is now used, the technical challenge consists in keeping said sine profile generated by the means for generating the sinusoidal signal profile in sync and in phase with the input voltage and/or frequency. For this purpose, it is preferred for the necessary functionality of a zero-crossing detection (which had still been integrated in the control unit in the generic DE 10 2012 111 853, for example), owing to quicker reaction times, to be designed to be discrete or to be provided separately from the control unit.

It is then in turn advantageous according to the development to provide the regulating means on the secondary side (with reference to the transformer), provided that this is provided on the same side as downstream interfaces (for example, the dimming functionality, too), wherein the sine output signal of the generating means according to the invention then provides a regulation setpoint value for said regulating means.

Otherwise, with regard to basic functionalities of the present invention, including in relation to developments discussed in the dependent claims, reference is made to DE 10 2012 111 853, which should be incorporated into the present disclosure as being part of the invention, both with regard to the realization of the control unit, the regulating and actuating functionalities therein and in relation to further peripheral electronics, for example the input-side rectifier means provided according to the development, the means for generating the supply voltage for the control unit and the threshold value means relating to activating or controlling the LLC converter (or providing a delay time below respective threshold value means). This also applies, in particular, to further constructional details or a realization in terms of circuitry regarding feasibility of the invention, including an LC converter variant.

As a result, the present invention achieves an elegant improvement of the approach already known from DE 10 2012 111 853, in particular in relation to a reduced sensitivity to input-side signal fluctuations (that is to say of the AC voltage input signal) and their influence on the current profile of the output current.

BRIEF DESCRIPTION OF THE DRAWINGS

Further advantages, features and details of the invention emerge from the following description of preferred exemplary embodiments and with reference to the drawings; FIGS. 1a, 1b, 2 to 4 and 7 to 9 of DE 10 2012 111 853 are likewise considered to be incorporated into the present disclosure as being part of the present invention for realizing the invention and for realizing an exemplary embodiment (provided they do not contradict constructional and circuit features which are to be described below in detail):

FIG. 2: a schematic functional diagram of the functional block 10 in FIG. 1 for processing the AC voltage input signal (based on the zero-crossings and further adjustment or correction processes) and an assignment of the signal functionality generated by the sinusoidal signal generation means according to the invention in the case of the output current being influenced (wherein FIG. 2 also adds to the block circuit diagram of FIG. 1 conceptually and/or with schematic functional modules); and FIGS. 3 and 4: a comparison of respective signal profile pairs of input AC voltage signal and output current in the case of fluctuation of the input voltage owing to disturbances in the case of generic technology (FIG. 3) in comparison with the present invention in the exemplary embodiment of FIGS. 1 and 2 (FIG. 4).

DETAILED DESCRIPTION

Figure 1:
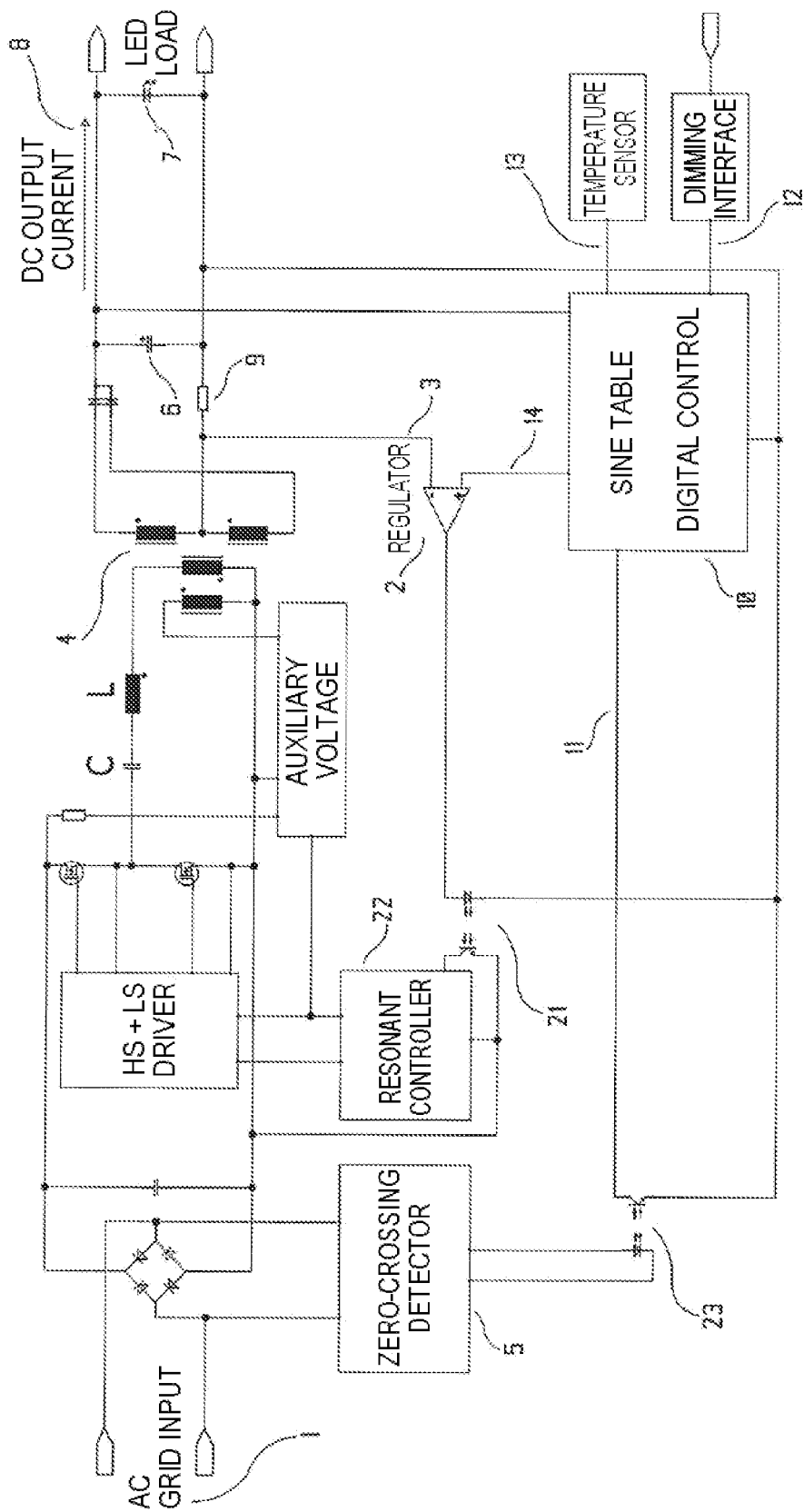
FIG. 1: a basic circuit diagram of the switching measurement time device according to a first preferred embodiment of the present invention.

FIG. 1 shows in the schematic block circuit diagram the basic design or the functional components of the switched-mode power supply device of a first preferred embodiment of the invention. In principle, FIG. 1 corresponds to FIG. 1b of the generic DE 10 2012 111 853; however, said device was modified in relation to a zero-crossing detection device 5 which is now designed to be discrete and outside of the (integrated) control unit. In addition, a sinusoidal signal-generating device 10 was provided, which sinusoidal signal-generating device has been decoupled with respect to its signal generation or sine form generation and is independent of the AC voltage input signal. In particular, the zero-crossing is generated from the AC voltage input signal only by the (discrete) unit 5, not the sine form itself, however (to this extent, the term "independent" or "decoupled" in the sense of the invention is only to be understood in relation to the sine form).

Figure 2:
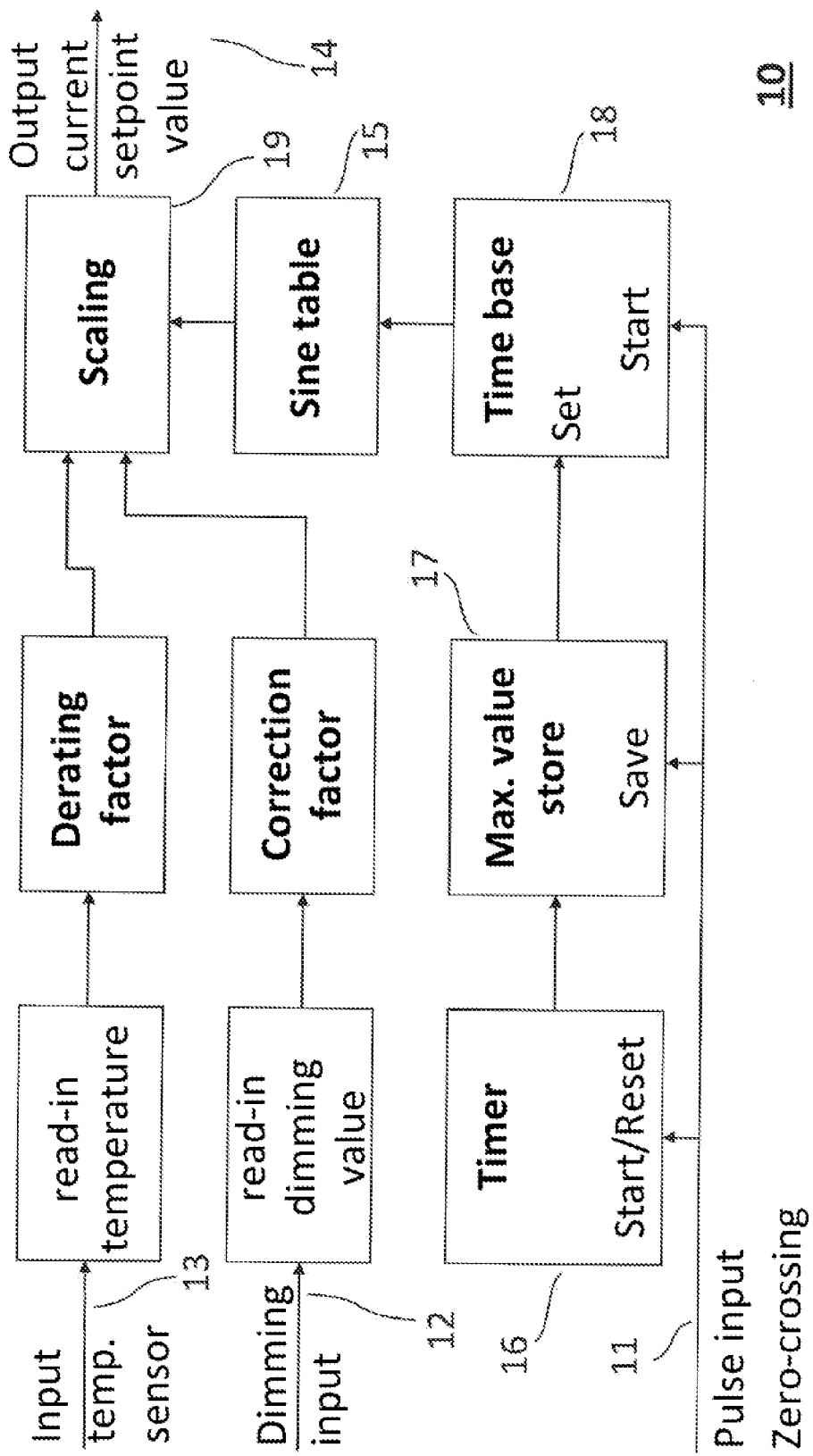

Specifically, the zero-crossing detector unit 5 which is designed as a discrete circuit generates a short pulse during each zero-crossing of the AC voltage input signal (at the input 1), which pulse is electrically isolated from the control unit 11 by means of an optocoupler 23. The purpose is the synchronization of the control unit (provided on the secondary side) and the functionality realized therewith. The advantage of said discrete realization (in the case of the generic technology, the zero-crossing detection was realized via a controller input or by means of software) is the greater speed in the signal processing; thus, cf. FIG. 2, which in this respect describes detailed functional groups of the unit 10, a timer 16 is started with each pulse of the zero-crossing detector and the time which has passed since a preceding pulse is stored (time storage unit 17). A read-out rate of the sine table 15 is then calculated from said stored value and hence a time base is determined. In order to make the shown system less sensitive to disturbances in the region of the zero-crossing, for example, a predetermined number of stored values (unit 17), typically approximately five, are averaged, wherein the time base for reading out the sine table 15 is determined on the basis of said average value. An advantageous effect of an adaptation such as this is the possibility to continuously react to changes in frequency of the mains voltage.

If, however, a next zero-crossing fails to appear (by a corresponding signal deviation of the AC voltage input signal), the detection of the zero-crossing is compulsorily triggered once a tolerance time has elapsed; this would also apply similarly for an operating mode (for example an input-side DC operation) in the case of which absolutely no zero-crossings are detected on the input side. In this case, for example, zero-crossing signals would usually be triggered every 10 ms within the system.

The detected half-sine-wave output current (reference sign 3) of the LLC converter is regulated to said setpoint value 14 output from the table unit and conducted via a filter capacitor 6 in an averaged or smoothed manner to the (LED) load 7. In terms of data, the values of the sine table are selected such that (averaged) they correspond to the maximum DC output current 8 to the load 7 preset through the entire system.

If (known) non-linearities or phase shifts are found in a transformer characteristic curve of the entire system, they can be taken into account by means of correspondingly corrected values in the sine table.

If it is necessary to influence the output current, for example by means of an overtemperature detected by a temperature sensor unit 13, values which are currently read out from the sine table are reduced by means of a scaling factor; this correspondingly applies to a dimming functionality enabled by means of the dimming interface 12, having the advantageous effect that the (approximate) sine form of the input current is always maintained and, in this respect, no system perturbances occur.

In regard to the functionality of the regulating unit 2, said regulating unit compares the table setpoint value 14 with the detector actual value 3 of the secondary current, wherein said actual value is obtained via a shunt resistor 9 in the exemplary embodiment (alternatively, however, this can also be generated using a current converter in both secondary strings or using a Hall element). The regulation deviation is transferred from the regulation amplifier 2 via an optocoupler which is provided for electrical decoupling to the primary side and actuates a resonant controller 22 there (in an otherwise known manner), which resonant controller generates from said regulation deviation a variable frequency for actuating the power stage (HS/LS driver) of the LLC converter. The resonant controller 22 can be both an analog control circuit and a separate controller circuit (or one which is integrated in the control unit); the same correspondingly applies to the regulating means 2, which can be both discrete and embodied separately from the control unit and integrated therein.

In turn, analogously to the procedure in DE 10 2012 111 853 (and with the purpose of avoiding an adverse transformer transformation ratio), the LLC converter is only activated above a predetermined or predeterminable absolute voltage level, typically approximately 70 volts. This functionality is also suitably implemented in the control unit. A positive consequence thereof is that the limit values required by the relevant standards for harmonics can continue to be observed; at the same time, the effect on the overall degree of efficiency of the device is positive.

Figure 3:
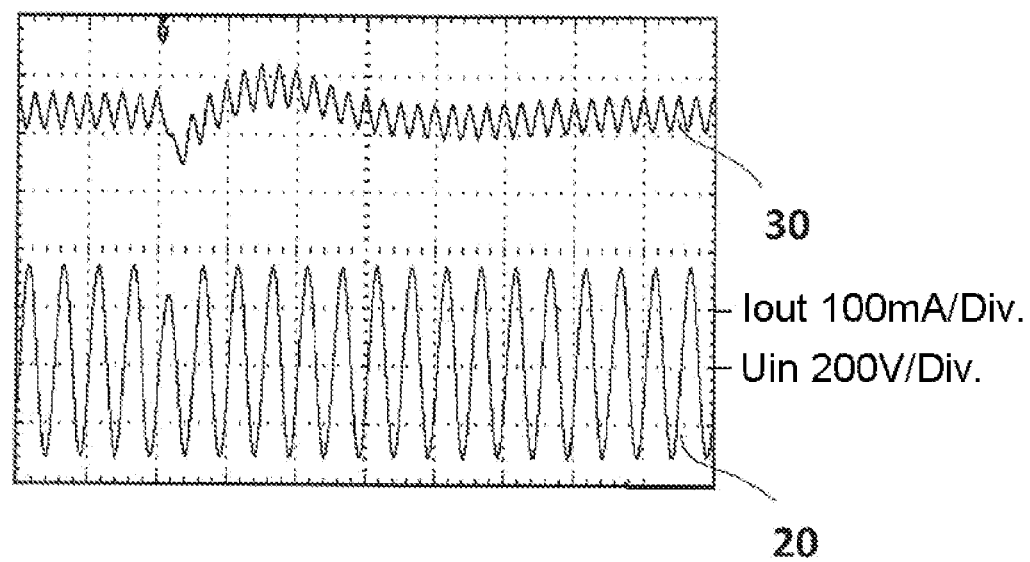
Figure 4:
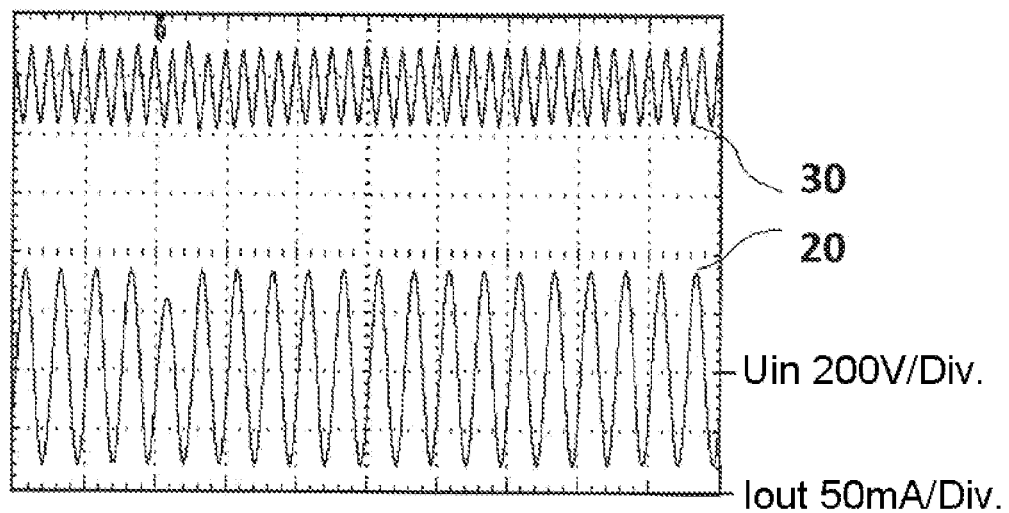

The result of decoupling, according to the invention, the sine generation from the signal shape of the AC voltage input signal is shown in FIG. 4 in direct comparison with FIG. 3 (which describes the function of the generic prior art): it is directly clear that, in reaction to a disturbance of the input signal acting on the signal shape, a much less significant change to the output-side current profile results, with the result that no disturbing flickering or similar reaction of a connected (LED illuminant) consumer is to be expected here.

The invention claimed is:

1. Switched-mode power supply device having
    an input (1) for receiving an AC voltage input signal, an output for providing a DC voltage signal and/or a direct-current signal to a downstream consumer,
    a transformer (4) having a primary winding and a secondary winding,
    and resonant converter means assigned to the primary side of the transformer, which resonant converter means form an LLC topology with inclusion of the primary winding and can be actuated with a variable-frequency control signal on the primary side by means of a control unit (11), wherein
    the control unit (11), which is realized by means of an integrated and/or programmable circuit component, generates the control signal in reaction to and as a function of a zero-crossing detection signal generated from the AC voltage input signal, a current flowing in the transformer windings, in particular on the secondary side, and a constant and/or predeterminable preset signal for an output current flowing at the output, in such a way that regulating means (2) associated with the control unit regulate the output current to the preset signal,
    and a phase of an input current flowing in the input is synchronized to the phase of the AC voltage input signal,
    wherein means (10) for generating a sinusoidal signal profile are associated with the regulating means, which signal profile-generating means are independent of the AC voltage input signal and act independently thereof.

2. Device according to claim 1, further comprising electronic means (5), separate from the control unit and/or of discrete design, for generating the zero-crossing detection signal from the AC voltage input signal.

3. Device according to claim 1, wherein the means for generating the sinusoidal signal profile have a sinusoidal oscillation generator, which is of discrete design and/or realized outside of the control unit, or storage and/or table means (15) which image a sinusoidal profile in terms of data and are, in particular, integrated in the control unit, or calculating means which generate a sinusoidal profile in terms of data as a function and are, in particular, integrated in the control unit.

4. Device according to claim 1, wherein the means (10) for generating the sinusoidal signal profile interact with means (13) for detecting an operating temperature of the switched-mode power supply device and/or with dimming means (12) for adjusting the preset signal for the output current such that said means can influence an amplitude of the generated sinusoidal signal profile.

5. Device according to claim 1, wherein no components for input-side reactive power compensation and/or no components for input-side harmonics filtration are formed outside of the integrated control means.

6. Device according to claim 1, wherein rectifier means are provided between the input and the resonant converter means such that the rectified and preferably unsmoothed AC voltage input signal is present at the resonant converter means.

7. Device according to claim 1, wherein the regulating means are formed on the secondary side of the transformer and/or are designed to process the current flowing in the secondary winding.

8. Device according to claim 1, wherein means (AUXILIARY VOLTAGE) for supplying power to the control unit, which means is designed to generate a supply voltage for the control unit from the rectified AC voltage input signal, from a winding associated with the resonant converter means and/or from a winding of the transformer as preferred alternative sources.

9. Device according to claim 1, wherein threshold-value means associated with the resonant converter means, said threshold-value means being designed such that the resonant converter means are only activated once a predetermined voltage threshold value of the AC voltage input signal has been exceeded.

10. Use of the switched-mode power supply device according to claim 1 for a load, to which a constant current or a current which is to be regulated is to be applied, as consumer, in particular arrangement of LED illuminants or battery to be charged, wherein dimming of the LED illuminants is realized by means of the predeterminable and variable preset signal.

* * * * *